United States Patent [19]

Avi-Itzhak

[11] Patent Number: 5,379,349
[45] Date of Patent: Jan. 3, 1995

[54] METHOD OF OCR TEMPLATE ENHANCEMENT BY PIXEL WEIGHTING

[75] Inventor: Hadar Avi-Itzhak, Mountain View, Calif.

[73] Assignee: Canon Research Center America, Inc., Palo Alto, Calif.

[21] Appl. No.: 937,732

[22] Filed: Sep. 1, 1992

[51] Int. Cl.$^6$ .......................... G06K 9/62; G06K 9/46; G06K 9/50
[52] U.S. Cl. ......................................... 382/15; 382/23; 382/30
[58] Field of Search ....................... 382/15, 14, 41, 30, 382/23, 39, 9, 26, 36, 34

[56] References Cited

U.S. PATENT DOCUMENTS

| | | | |
|---|---|---|---|
| 3,209,328 | 9/1965 | Bonner | 382/15 |
| 3,275,986 | 9/1966 | Dunn et al. | 382/14 |
| 3,539,994 | 9/1967 | Clapper | 382/14 |
| 3,588,823 | 6/1971 | Chow | 382/15 |
| 5,159,644 | 10/1992 | Martin et al. | 382/14 |
| 5,204,914 | 4/1993 | Mason et al. | 382/14 |

*Primary Examiner*—David K. Moore
*Assistant Examiner*—Michael Cammarata
*Attorney, Agent, or Firm*—Paul Hentzel

[57] ABSTRACT

A library of L unenhanced images (pixel bit maps) is enhanced for optical character recognition (OCR) with respect to a pre-existing group of G input symbols (pixel bit maps) for creating a library of G recognition enhanced templates (pixel bit maps) of the G input symbols. The enhancement is accomplished by comparing each image of the library with each symbol of the group, and weighting the images with the highest potential for confusion. A primary comparison $C^*$ and a secondary comparison $C^{**}$ are identified from the L comparisons within each of the G sets of comparisons. A recognition margin is determined between each pair of identified comparisons $C^*$ and $C^{**}$. The single pair of identified comparisons $C^*$ and $C^{**}$ is selected forming the smallest recognition margin $M^*$. The single pair of images $I_j^*$ and $I_j^{**}$ underlying the pair of identified comparisons $C^*$ and $C^{**}$ is identified. Certain pixels of the closest pixel image $I_j^*$ and the next closest pixel image $I_j^{**}$ are weighted in order to increase the recognition margin $M^*$ therebetween. The steps are iterated until the library of pixel images has become a library of sufficiently enhanced symbol templates. The weighted pixel abberations generated in the enhanced templates are not present in the corresponding pixel symbol of the pre-existing group of G pixel symbols.

28 Claims, 6 Drawing Sheets

Providing the Library
  of L unenhanced Pixel Images

Providing the Group
  of G Pixel Symbols

Comparing the Input Symbols
  with the L Images
  to obtain GxL Comparisons

Identifying
  the Primary Comparison C*

Identifying
  the Secondary Comparison C**

Determining
  the Recognition Margins

Selecting the Pair
  of Comparisons C* and C**
  having the Smallest Margin M

Identifying the Pair
  of Underlying Images I* and I**

Weighting Certain Pixels
  of Image I* or Image I** or Both

Iterating the Steps
  Until the Pixel Images
  Become Pixel Templates

Providing the Library
of L unenhanced Pixel Images

Providing the Group
of G Pixel Symbols

Comparing the Input Symbols
with the L Images
to obtain GxL Comparisons

Identifying
the Primary Comparison C*

Identifying
the Secondary Comparison C**

Determining
the Recognition Margins

Selecting the Pair
of Comparisons C* and C**
having the Smallest Margin M

Identifying the Pair
of Underlying Images I* and I**

Weighting Certain Pixels
of Image I* or Image I** or Both

Iterating the Steps
Until the Pixel Images
Become Pixel Templates

Fig 2

METHOD OF OCR TEMPLATE ENHANCEMENT BY PIXEL WEIGHTING

TECHNICAL FIELD

This invention relates to optical character recognition of input symbols, and more particularly to the enhancement of pixel templates to facilitate the matching of the templates with the input symbols.

BACKGROUND

Heretofore, correlation coefficients have been employed to identify incoming pixel images such as radar return signals and character bit maps. The input pixel images were compared to library template images on a pixel by pixel basis. The summation of all of the pixel comparisons in each image/template match produced a correlation coefficient indicating the closest match. However, these prior correlation techniques did not involve any change or enhancement of the pixels forming the library templates.

SUMMARY

It is therefore an object of this invention to provide a template enhancement method for improving the recognition of optical characters.

It is another object of this invention to provide such a template enhancement method which maximizes the minimum margin between a primary comparison and a maximum secondary comparison.

It is another object of this invention to provide such a template enhancement method in which pixel weighting emphasizes the differences between the templates and the input symbols.

It is another object of this invention to provide such a template enhancement method in which pixel weighting suppresses the similarities between the templates and the input symbols.

Briefly, these and other objects of the present invention are accomplished by providing a method of recognition enhancement of a library of L unenhanced pixel images $(I_1 I_2 I_3 \ldots I_j \ldots I_L)$ with respect to a pre-existing group of G pixel symbols $(S_1 S_2 S_3 \ldots S_i \ldots S_G)$ for providing a library of G recognition enhanced pixel templates $(T_1 T_2 T_3 \ldots T_i \ldots T_G)$ of the G pixel symbols. Each of the G pixel symbols are compared with each of the L pixel images to obtain $G \times L$ comparisons forming G sets of L comparisons $(C_1 C_2 C_3 \ldots C_j \ldots C_L)$. One set of L comparisons is formed for each pixel symbol $S_i$ of the G pixel symbols. Each set of comparisons having a comparison $C_i$ for each pixel image $I_j$. The primary comparison $C_i^*$ is identified from the L comparisons within each of the G sets of comparisons having the closest comparison with the pixel symbol $S_i$ for that set of comparisons. The secondary comparison $C_i^{**}$ is identified from the L-1 remaining comparisons within each of the G sets of comparisons having the next closest comparison with the pixel symbol $S_i$ for that set of comparisons. G pairs of identified comparisons $C_i^*$ and $C_i^{**}$ are formed, one pair from each of the G sets of comparisons. G recognition margins $(M_1 M_2 M_3 \ldots M_i \ldots M_G)$ are determined, one recognition margin between each pair of identified comparisons $C_i^*$ and $C_i^{**}$. The single pair of identified comparisons $C_i^*$ and $C_i^{**}$ is selected which forms the smallest recognition margin $M_i^*$ of all of the G pairs of identified comparisons from the G sets of comparisons. The single pair of pixel images $I_j^*$ and $I_j^{**}$ is identified which corresponds to the pair of identified comparisons $C_i^*$ and $C_i^{**}$. Certain pixels of either the closest pixel images $I_j^*$ or the next closest pixel image $I_j^{**}$ or both are weighted. The weighted images correspond to the selected pair of identified comparisons $C_i^*$ and $C_i^{**}$ in order to increase the recognition margin $M_i^*$ therebetween. The comparing, identifying, determining, selecting, and weighting steps are iterated until the library of pixel images has become a library of enhanced symbol templates $(T_1 T_2 T_3 \ldots T_i \ldots T_G)$ at least some of which have weighted pixel abberations not present in the corresponding pixel symbol of the pre-existing group of G pixel symbols $(S_1 S_2 S_3 \ldots S_i \ldots S_G)$.

BRIEF DESCRIPTION OF THE DRAWING

Further objects and advantages of the template enhancement technique will become apparent from the following detailed description and drawings in which:

FIG. 2 is a flow chart showing the steps in the method of template enhancement;

Figure 1A:
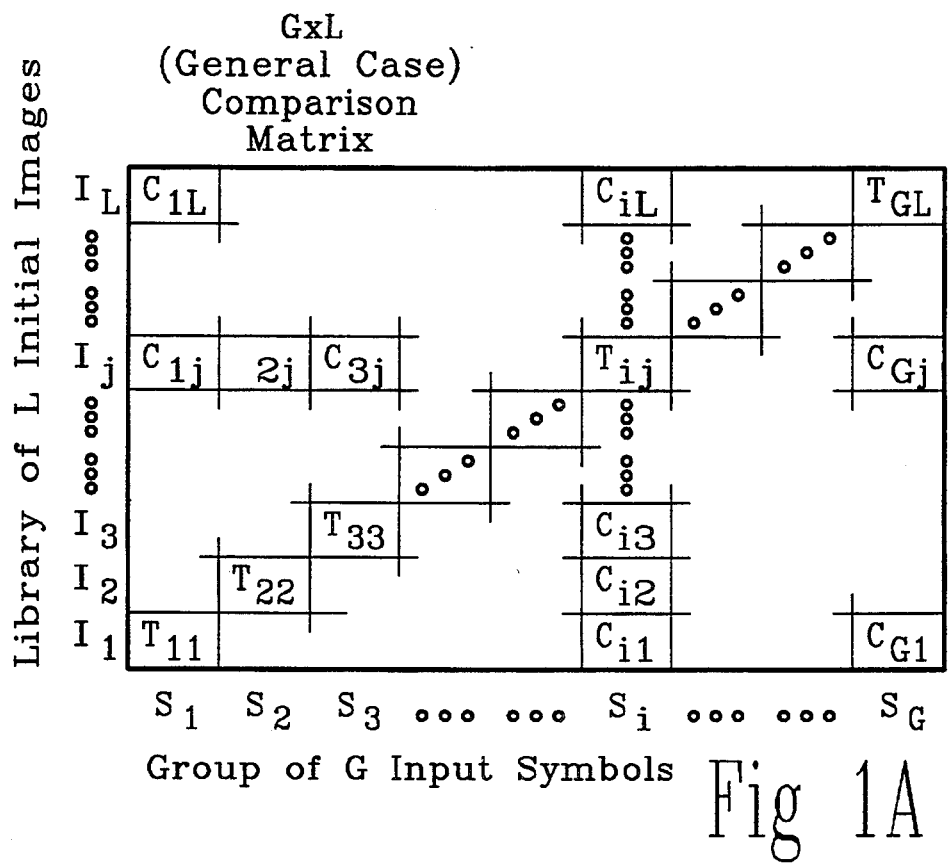
FIG. 1A is a comparison matrix (general case) showing $G \times L$ comparisons between a group of G input symbols and a library of L images.
Figure 1B:
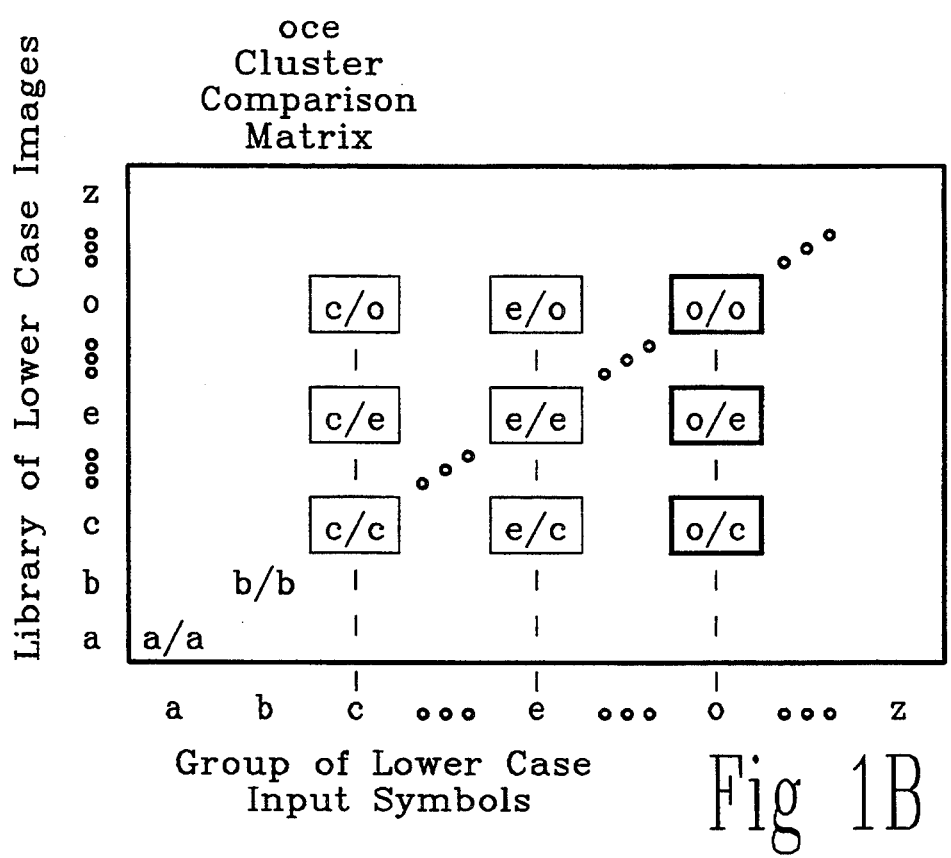
FIG. 1B is a comparison matrix between the lower-case input symbols a–z and a library of lower-case images.

GENERAL METHOD OF ENHANCEMENT—(FIGS. 1A 1B and 2)

A library of L unenhanced images (pixel bit maps) is enhanced for optical character recognition (OCR) with respect to a pre-existing group of G input symbols (pixel bit maps) for creating a library of G recognition enhanced templates (pixel bit maps) of the G input symbols. The enhancement is accomplished by comparing each image of the library with each symbol of the groups and weighting the images with the highest potential for confusion. The library of L unenhanced images extends along the vertical axis of the $G \times L$ comparison matrix of FIG. 1A (shown as images $I_1 I_2 I_3 \ldots I_j \ldots I_L$). The pre-existing group of G input symbols extends along the horizontal axis of the matrix (shown as symbols $S_1 S_2 S_3 \ldots S_i \ldots S_G$). The library of G recognition enhanced templates $(T_1 T_2 T_3 \ldots T_i \ldots T_G)$ is not shown in $G \times L$ matrix. However, the symbol/image comparisons for the library of G recognition enhanced templates extend along the diagonal of the $G \times L$ matrix (shown as template comparisons $T_{11} T_{22} T_{33} T_{ij} \ldots T_{GL}$) where the input symbols correspond to the unenhanced images. This diagonal template relationship assumes that the symbols and images are presented along each axis in the same order, that is $S_i = I_j$, and $S_{i+1} = I_{j+1}$. A comparison matrix for lower-case symbols a–z is shown in FIG. 1B, specifically illustrating the symbol/image comparisons for the cluster of look-alike characters "o" "c" and "e".

The steps of the template enhancement method are summarized in FIG. 2, and described in detail below.

Providing the library of L unenhanced pixel images ($I_1 I_2 I_3 \ldots I_j \ldots I_L$) which will evolve into the distinctive library of G enhanced templates.

Providing the group of G pixel symbols ($S_1 S_2 S_3 \ldots S_i \ldots S_G$) in the specific user font of interest. Common fonts for alpha-numeric applications are Courier and Times Roman. Typically, user fonts include

| | |
|---|---|
| upper-case | ABCDEFGHIJKLMNOPQRSTUVWXYZ |
| lower-case | abcdefghijklmnopqrstuvwxyz |
| numbers | 1234567890 and |
| punctuation | !@#$%^&*()_+-=[]{};" :"~\ \|,<.>/?. |

This enhancement technique may be applied to other recognition applications such as radar return signals, and audio recognition applications involving phoneme sound patterns (speech fonts).

The fonts of the unenhanced images and input symbols may be identical for maximizing the initial symbol-/image comparison, and for providing a convenient starting place for the template evolution. Alternatively, the initial image font may be a general font or special precursor font of the input symbol font; or even a template based on random noise. The number of images L in the library may be equal to or greater than the number of symbols G in the group. The library may have image entries which are not included among the input symbols. These "idle" images are not involved in the symbol/image comparisons, and therefore do not change and become templates. Preferably, L is not be less than G, to avoid a single image attempting to evolve in response to two separate input symbols.

Comparing each of the G input symbols with each of the L unenhanced images to obtain $G \times L$ comparisons as shown in the body of the $G \times L$ matrix of FIG. 1. The symbol/image comparisons are accomplished by comparing each pixel of general unenhanced image $I_j$ with each pixel of general input symbol $S_i$ based on a comparison function (discussed in more detail later Cauchy-Shwartz section), The $G \times L$ comparison form G sets of L comparisons with one set of L comparisons for each input symbol. Each set of L comparisons includes a comparison $C_{ij}$ for each unenhanced image $I_j$, The set of comparisons for general symbol $S_i$ extends upwards in the column above $S_i$ (shown as $C_{i1} C_{i2} C_{i3} \ldots T_{ij} \ldots C_{iL}$). The initial column set of L comparisons for the input symbol "o" (lower-case) relative to an alpha-numeric image font is displayed in the image set chart of FIG. 3A.

Identifying the primary comparison C* from the L comparisons within each of the G sets of comparisons having the closest comparison with the pixel symbol $S_i$ for that set. A total of G primary comparisons C* are identified forming a row primary collection ($C_1^* C_2^* C_3^* \ldots C_i^* \ldots C_L^*$) The highest comparison $C_i^*$ for the input symbol "o" (lower-case) is of course the unenhanced image "o" (lower-case).

Figure 3A:
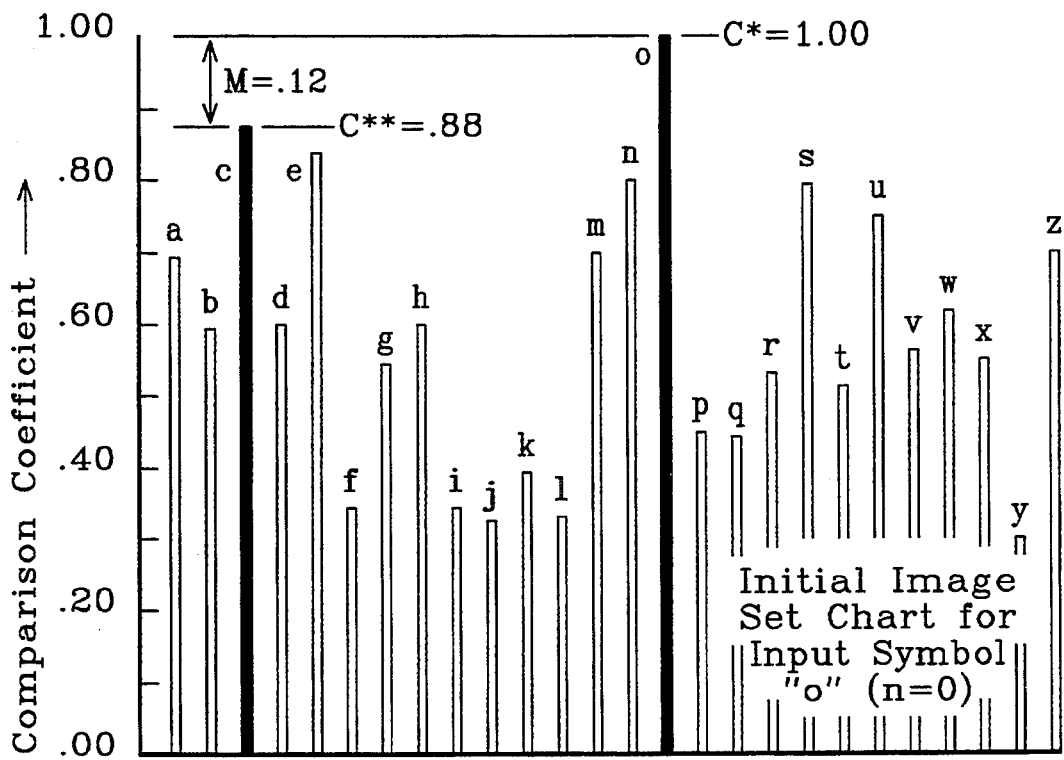
FIG. 3A is a set chart of initial image comparison coefficients between the single lower-case input symbol "o" and the lower-case letters a–z of FIG. 1B.

Identifying the secondary comparison C from the L-1 remaining comparisons within each of the G sets of comparisons having the next closest comparison with the input symbol $S_i$. The image underlying the secondary comparison C is the most likely image to be confused with the input symbol, A total of G secondary comparisons C are identified forming a row secondary collection ($C_1^{} C_2^{} C_3^{} \ldots C_i^{} \ldots C_L^{}$). The primary and secondary collections form G pairs of identified comparisons C* and C, one pair from each of the G column sets of comparisons. The next highest comparison C for the input symbol "o" in FIG. 3A is the o/c secondary comparison for the unenhanced image "c" (lower-case). The symbols "o" and "c" and "e" form a cluster of similarly shaped images which have a high potential for confusion and become "anti-characters" (see next section on anti-character and clusters).

Determining G recognition margins ($M_1 M_2 M_3 \ldots M_i M_G$), one recognition margin between each pair of identified primary and secondary comparisons C* and C**. A total of G recognition margins M are determined. The size of the margin M is the difference between the value of C* and the value of C** The o/c margin is 0.88 as shown in FIG. 3A.

Selecting the single pair of identified comparisons C* and C** forming the smallest recognition margin M* of all of the G pairs of identified comparisons. The smaller the recognition margin, the greater is the danger of OCR confusion.

Identifying the single pair of images I* and I** underlying the pair of identified comparisons C* and C**. The image I* is the match for the input symbol $S_i$ and image I** is the most probable source of confusion with $S_i$.

Weighting certain pixels of either the closest pixel image I* or the next closest pixel image I** or both, which underlie the selected pair of identified comparisons C* and C** in order to increase the recognition margin M* therebetween causing the pixel images to become the closest pixel template T* or the next closest pixel template T** or both causing the pixel images to become the closest pixel template T* or the next closest pixel template T** or both.

Iterating the comparing, identifying, determining, selecting, and weighting steps until the library of pixel images has become a library of sufficiently enhanced symbol templates ($T_1 T_2 T_3 \ldots T_i \ldots T_G$). The weighted pixel abberations generated in the enhanced templates are not present in the corresponding pixel symbol of the pre-existing group of G pixel symbols ($S_1 S_2 S_3 \ldots S_i \ldots S_G$).

Matching an unknown input pixel symbol of the group of G pixels symbols ($S_1 S_2 S_3 \ldots S_i \ldots S_G$) with the library of enhanced templates ($T_1 T_2 T_3 \ldots T_i \ldots T_G$) by comparing the unknown pixel symbol with each of the enhanced pixel templates in the library of enhanced templates and selecting the enhanced template with the closest comparison.

TERMINATION

The enhancement weighting process is terminated when the smallest recognition margin generated between the input symbols and the templates is greater than a predetermined "safe" minimum value. That is, when even the most error prone symbol/template comparison has a sufficiently high probability of being correct. The process may also be terminated when the incremental increase in the smallest margin is smaller than a predetermined minimum increase. That is, when the rate of change of the recognition margin of the templates each iteration is negligible and does not merit the time required. Alternatively, the process may be stopped after a specified number of weighting iterations have been executed; or preassigned period of processing time has elapsed. The enhancement of the templates may be occasionally slowed by the formation of a "local maxima" in the margin contour between the primary comparison and the secondary comparison. If the local maxima is an unstable one, it releases during subsequent iterations; and the enhancement process returns to the prior unhindered speed. However, if the local maxima is stable, the enhancement process becomes permanently locked between the primary and secondary comparison. The recognition margin remains fixed at the same level with zero change.

ANTI-CHARACTER—(FIGS. 3A 4A 5A)

The symbols "o" and "c" and "e" form a cluster of similarly shaped images having a high potential for confusion. The characters of the cluster become mutual "anti-characters", when they come into contrast with one another during the enhancement process. Initially only "o" and "c" are anti-characters (shown in bold in the "o" column set chart of FIG. 3A). The cluster of anti-characters for "o" then expands to include the "censu" anti-characters (shown in bold in the "o" column set chart of FIG. 3B). Other clusters of lower-case look-alike anti-characters are formed by "f" and "t" and by "h" and "b". An example of a punctuation look-alike is "," and ";". A particularly difficult look-alike cluster is formed by the number "1", the lower-case letter "l", the upper-case letter "I", and the exclamation point "!". The template for each member symbols of a cluster of look-alike anti-characters must distinguish itself against the other members of the same cluster.

A comparison matrix for lower-case symbols a-z is shown in FIG. 1B, specifically illustrating the symbol/image comparisons of the cluster of look-alike characters "o", "c", and "e". The input symbol fonts (including "o", "c", and "e" lower-case) extend in alpha-numeric order along the horizontal axis of the FIG. 1B comparison matrix. The image fonts (also including "o", "c", and "e" lower-case) extend along the vertical axis. The initial set of L comparisons of the input symbol "o" with each of the images is shown in FIG. 1B extending vertically in a column above the "o" input symbol. Only the lower-case images nave been shown in FIG. 1B to conserve space. The upper-case and numbers and punctuation are have been omitted.

Figure 4A:
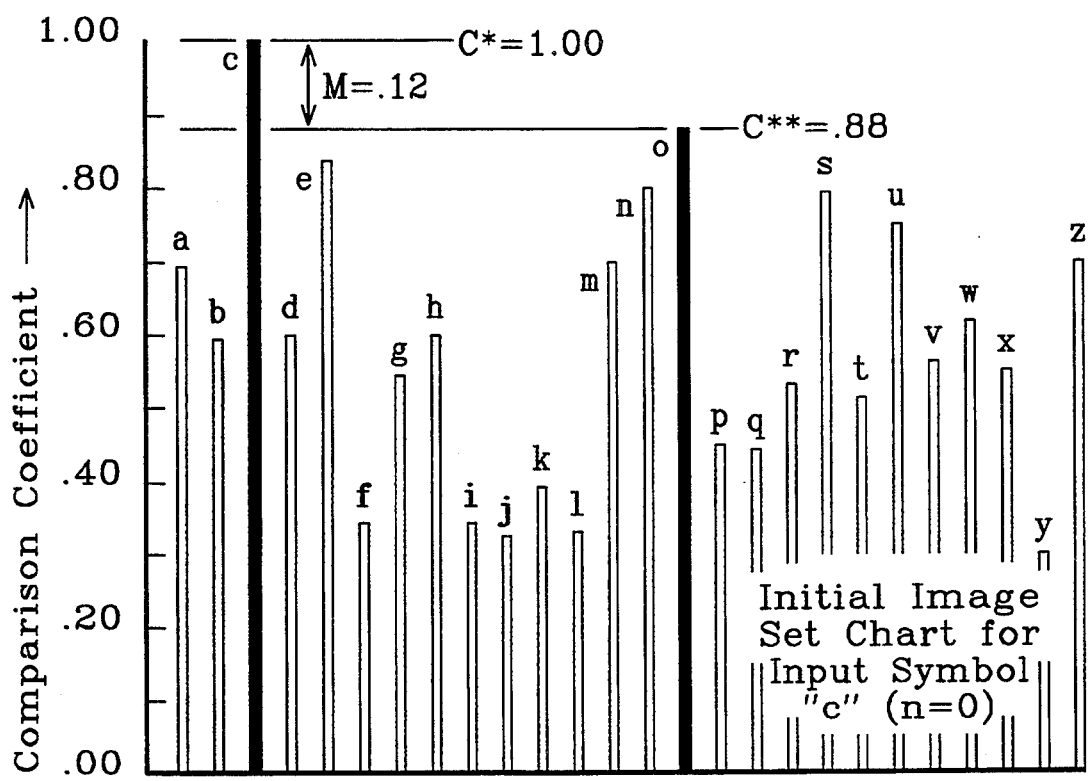
FIGS. 4A and 4B are set charts for the lower-case input symbol "c" similar to FIGS. 3A and 3B.
Figure 5A:
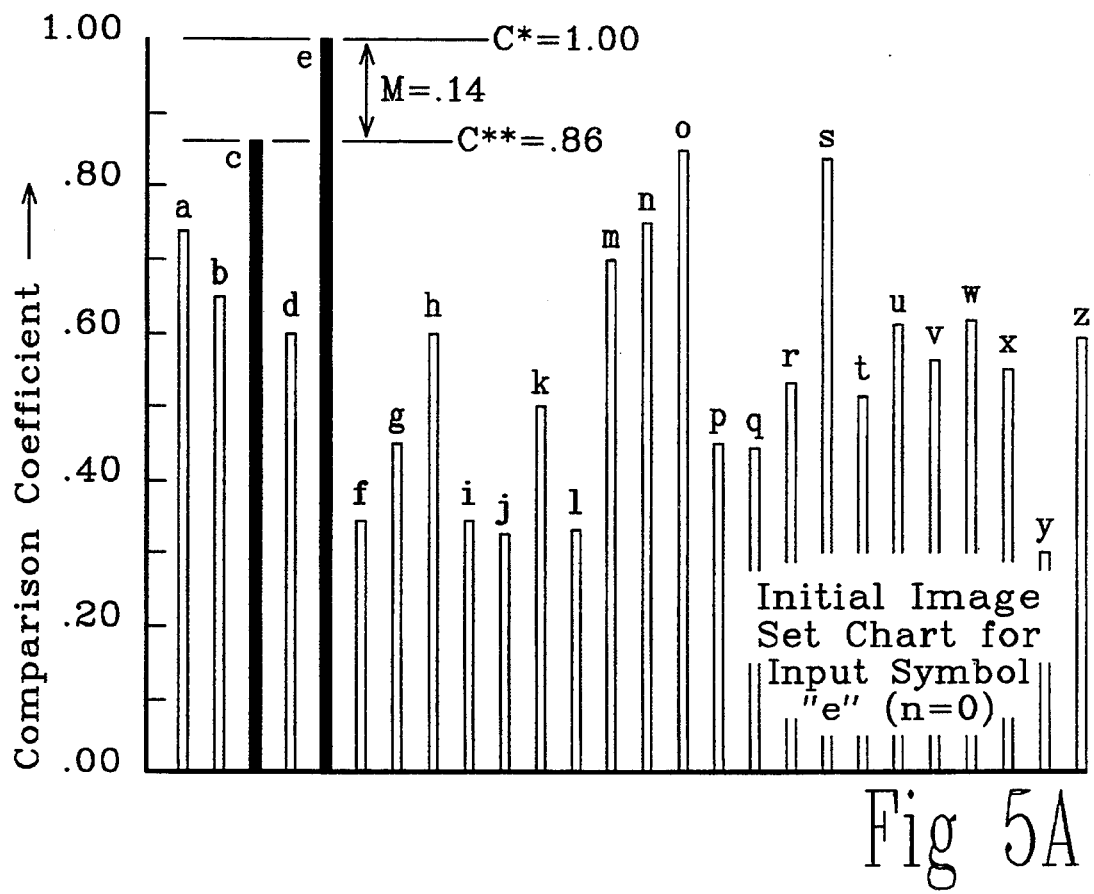
FIGS. 5A and 5B are set charts for the lower-case input symbol "e" similar to FIGS. 3A and 3B.

The column of L initial comparisons for the input symbol "o" (lower-case) is displayed in a different format in the image set chart of FIG. 3A. The initial unenhanced images extend in alpha-numeric order along the x axis of the chart. The value of the symbol/image comparisons (between 0 and 1.00) are plotted against the y axis. The "o" column set chart of FIG. 3A is based on the lower-case comparison matrix of FIG. 1B; more particularly on the "o" comparisons in the vertical column extending upwards from the "o" position along the horizontal axis. Each symbol of the group of G input symbols has a distinct image set chart containing L symbol/image comparisons similar to the "o" set chart of FIG. 3A. The image column set chart of initial comparisons for the input symbol "c" is shown FIG. 4A, and the image column set chart for "e" is shown in FIG. 5A.

During the primary comparison step, a total of G primary comparisons $C^*$ are identified. The highest comparison $C^*$ for the input symbol "o" (lower-case) is of course the unenhanced image "o" (lower-case). The o/o comparison (bold) has a value of 1.00 because in the embodiment of FIG. 3A the image font is identical to the symbol font. The $C^*$ for input symbol "c" is the image "c" at a value of 1.00 (see FIG. 4A—bold) and the $C^*$ for the input symbol "e" is the image "e" (see FIG. 5A—bold).

During the secondary comparison step, a total of G secondary comparisons $C^{**}$ are identified, forming G pairs of identified comparisons $C^*$ and $C^{}$, one pair from each of the G sets of comparisons. The next highest comparison $C^{}$ for the input symbol "o" in FIG. 3A is the o/c comparison (bold) for the unenhanced image "c" (lower-case) which is more like the symbol "o" than any of the other L-1 images in the alphanumeric library. The o/c comparison (bold) has a value of only 0.88 because the image "c" is not identical to the input symbol "o". The o/e comparison of FIG. 3A is slightly less at 0.84. In the case of input symbol "c" (see FIG. 4A), $C^{}$ is the comparison c/o (bold) at a value of 0.88. In the case of the input symbol "e" (see FIG. 5A), $C^{}$ is the comparison e/c (bold) at 0.86.

The size of the recognition margin M determined in the each iteration is the difference between the value of $C^*$ and the value of $C^{**}$. The initial o/c margin is 0.12 (see FIG. 3A), and the initial c/o margin is also 0.12 (see FIG. 4A). The initial e/c margin is 0.14 (see FIG. 5A).

GENERAL CASE OF dM/dT* AND dM/dT**

The general case of template enhancement with respect to a particular input symbol $S_i$ involves maximizing the minimum recognition margin between the primary comparison $C^*$ and the maximum secondary comparison $C^{**}$ which form the selected pair of identified comparisons $C^*$ and $C^{**}$, in the general relationship:

$$\text{maximize } M = \min[C^* - \max(C^{**})]$$

where
  M is the recognition margin between $C^*$ and $C^{**}$,
  $C^*$ is the primary comparison for the template $T^*$ which is the closest template in the library to the input symbol $S_i$, and
  $C^{}$ is the secondary comparison for the template $T^{}$ which is the second closest template in the library to the input symbol $S_i$.

Multi-variable functions such as the recognition margin M may be maximized by a number of general numerical optimization processes. The process employed in the embodiment of FIGS. 3, 4, and 5, is the "gradient ascent" or "steepest ascent" technique; and is related to the steepest descent technique employed in minimization problems. In order for the recognition margin M to increase, $C^{**}$ must be reduced by the weighting, or $C^*$ must be increased, or both. The incremental weighting effect within template $T^{}$ evolves pixel abberations in the bit map thereof which reduces $C^{}$. That is, after multiple iterations of weighting, $T^{}$ looks less and less like the input symbol $S_i$, causing comparison $C^{}$ to have a lower value.

Figure 3B:
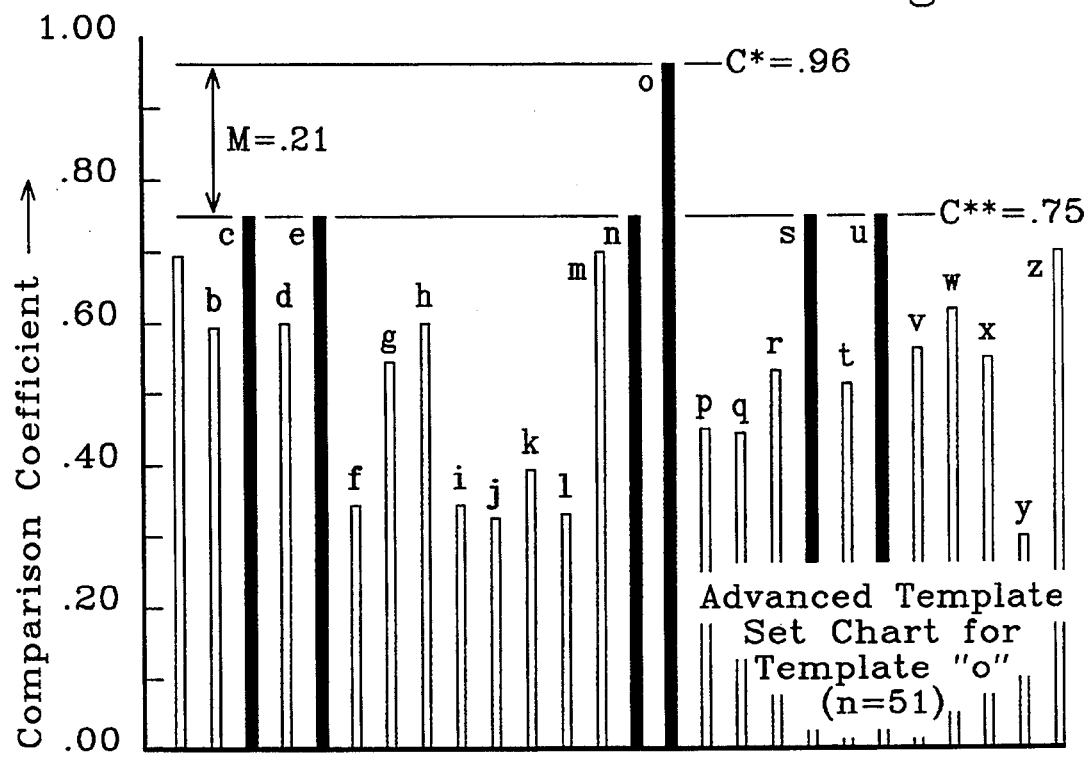
FIG. 3B is a set chart of advanced template comparison coefficients between the lower-case input symbol "o" and the lower-case letters a–z.
Figure 4B:
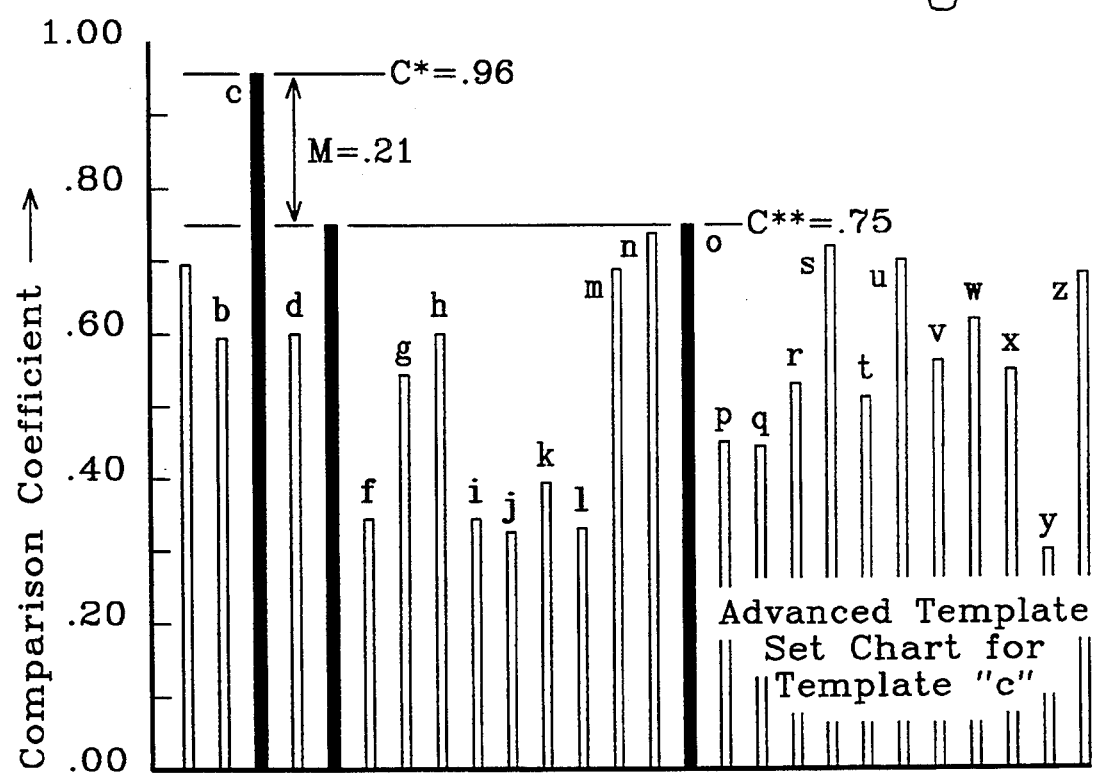
Figure 5B:
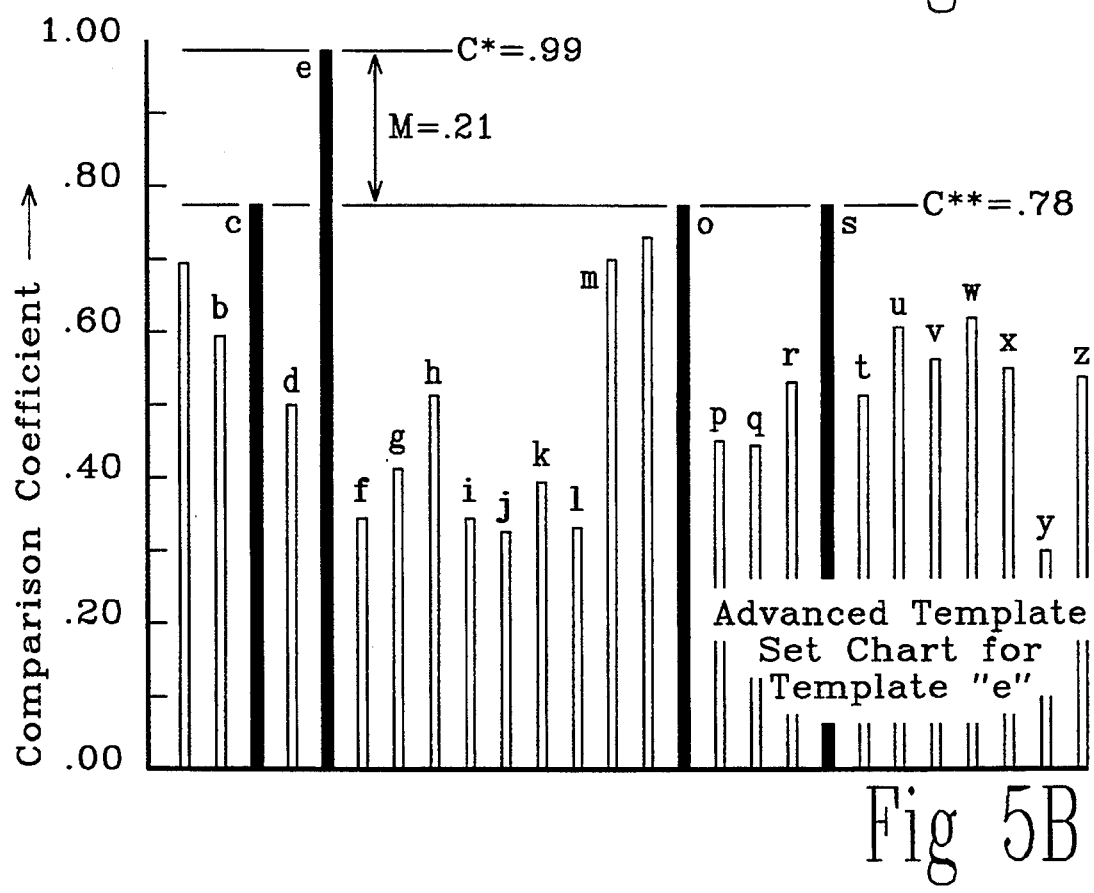

The resulting increase in the o/c margin is displayed in advanced template column set chart of FIG. 3B (shown immediately under the initial image set chart of FIG. 3A). The "o" template chart shows an advanced set of L comparisons for the input symbol "o" (lower-case) relative to the templates (lower-case). The advanced template chart of FIG. 3B has the same format as the initial image chart of FIG. 3A. The enhanced templates extend in alpha-numeric order along the x axis of the chart. The value of the comparison is plotted against the y axis. The o/c margin has increased from 0.12 as shown in the initial image chart of FIG. 3A, to 0.21 as shown in the advanced template chart of FIG. 3B. Each of the G input symbols has a distinct template set chart containing L comparisons similar to the "o" set of FIG. 3B, which evolves from the initial image set chart. The template column set chart of advanced comparisons for the input symbol "c" is shown FIG. 4B, and the template set chart for "e" is shown in FIG. 5B.

The incremental weighting effect also accumulates pixel abberations in the bit map of template T* and may cause a slight reduction in C*. That is, after multiple iterations of weighting, T* looks less and less like the input symbol $S_i$. However, because M is maximized, each iteration, C* is maintained at a level near 1.00. The resulting decrease in the o/o comparison may be seen in advanced template set chart of FIG. 3B. The o/o comparison has been reduced from 1.00 in FIG. 3A to 0.96 in FIG. 3B. The c/c comparison has also been reduced to 0.96 (see FIG. 4B), and the e/e comparison has become 0.98 (see FIG. 5B).

In the case of the symbol/image comparison o/c (see FIG. 3B), the o/c margin increases and approaches the o/e margin of 0.21. When the o/c margin is greater than the o/e margin, the C of the o/e comparison replace the C of the o/c comparison. As the iterations proceed, template T** alternates between template "c" and template "e" until both the o/c margin and the o/e margin drop below the margin for yet another image such as "n" or "s". As the recognition margin increase, the cluster "o" of anti-characters expands to include "c", "e", "n", "s" and "u" as shown in FIG. 3B. Further enhancement of the "o" template would increase the margin slightly to include "m" and "z". FIG. 4B shows a cluster of anti-characters accumulating near the 0.75 comparison value for input symbol "c"; and FIG. 5B shows the cluster "c", "o", and "s" at 0.77.

The maximum margin M is established by incrementally weighting template T* and template T** during the comparing-iteration cycles. The incremental templates weights W* and W** are determined through the first derivative (vector gradient) of the recognition margin relative to the multi vector components of templates T* and T**:

$$dM/dT^* = dC^*/dT^* - dC^{**}/dT^*$$

and $$dM/dT^{**} = dC^*/dT^{} - dC^{}/dT^{**}.$$

The step weight increments which are added to T* and to T** each iteration are:

$$W^* = u^*(dM/dT^*)$$

and $$W^{} = u^{}(dM/dT^{**})$$

where
u* is the weighting factor mu in dM/dT* for each comparing iteration
and
u is the weighting factor mu in dM/dT for each comparing iteration.

The weighting factors u* and u** may be the same or different depending on the enhancement application. In general, a larger mu will support a larger change in M each iteration resulting in a higher rate of evolution. However, large changes may cause tunnelling under the target maxima in the M function, and initiate unstable oscillations in the iteration process. Small mus are slower and more stable. A modest mu may be employed to approach a maxima, and reduced to a smaller mu to more precisely locate the maxima.

Each iteration "n" of the enhancement process produces a new template $T_{n+1}$ which is slightly different from the old template $T_n$ as shown below:

$$T^*_{n+1} = T^*_n + W^* = T^*_n + u^*(dM/dT^*)$$
$$= T^*_n + u^*(dC^*/dT^* - dC^{**}/dT^*)$$

$$T^{}_{n+1} = T^{}_n + W^{} = T^{}_n + u^{}(dM/dT^{})$$
$$= T^{}_n + u^{}(dC^*/dT^{} - dC^{}/dT^{**})$$

With each iteration, T and C drift further from T* and C*, and the recognition margin M becomes larger. The separation continues until a new pair of identified primary and secondary comparisons C* and C** (with new templates T* and T**) replace the present ones.

EVOLUTION OF "o" ANTI-CHARACTERS
"censu"

The evolution of the library of templates in response to the input symbol "o" and the expanded anti-character cluster "c", "e", "n", "s", and "u" is shown below. This iteration by iteration sequence is based on the chart data of FIGS. 3A and 3B, and the initial condition that the initial Template "o" is identical to Symbol "o", with a single weighting factor of u* = u** = 0.01.

At n=0 (before any iterations)

Template $o_0$ = Input Symbol o

At n=10 (after 10 iterations)

Template $o_{10}$ = (Tem $o_0$) − 0.10(Tem c)

The Tem c coefficient is the product (n)(u) = (10)(0.01) = 10. For the first ten iterations 1–10, the template for C** is only Tem c, and the increase in M per iteration is rapid.

At n=16

Template $o_{16}$ = (Tem $o_0$) − 0.13(Tem c) − 0.03(Tem e)

During the six iterations 11–16, the template for C** alternates between Tem c and Tem e. Each coefficient increases by 3×0.01, and the increase in M per iteration is less rapid.

At n=28

Template $o_{28}$ = (Tem $o_0$) − 0.17(Tem c) − 0.07(Tem e) − 0.04(Tem n)

During the 12 iterations 17–28, the template for C** alternates between Tem c, Tem e and Tem n. Each coefficient increases by 4×0.01.

At n=36

Template $o_{36}$ = (Tem $o_0$) − 0.19(Tem c) − 0.09(Tem e) − 0.06(Tem n) − 0.02(Tem s)

During the 8 iterations 29–36, the template for C** alternates between Tem c, Tem e, Tem n and Tem s. Each coefficient increases by 2×0.01.
At n=51

Template $o_{51}$=(Tem $o_0$)−0.22(Tem $c$)−0.12(Tem $e$)−0.09(Tem $n$)−0.05(Tem $s$)−0.03(Tem $u$)

During the 15 iterations 37–51, the template for C** alternates between Tem c e Tem n Tem s and Tem u. Each coefficient increases by 3×0.01, and the increase in M per iteration is very slow.
Each input symbol and associated cluster has a similar sequence in which the comparisons for the anti-characters evolve toward a common comparison value and recognition margin. As the iterative process continues, the number of anti-characters increases slowing down the rate of evolution. The process may be terminated when the minimal improvement in enhancement for the next iteration does not merit the computer effort required.

COMPARISON FUNCTION—CAUCHY-SHWARTZ

The comparison function between any input symbol $S_i$ and the library templates $(T_1\ T_2\ T_3\ \ldots\ T_i\ \ldots\ T_G)$ involves a pixel by pixel treatment and summation of the $S_i$ bit map with each of the template bit maps. The pixel by pixel treatment provides the set of numerical comparison coefficients $(C_{i1}\ C_{i2}\ C_{i3}\ \ldots\ T_{ij}\ \ldots\ C_{iL})$ for the input symbol $S_i$. The G×L comparisons are numerical coefficients of comparison, the value of which indicates the degree of pixel similarity between the symbol $S_i$ and the template under comparison. Preferably, a coefficient having a high value indicates a close comparison between $S_i$ and the template, and a coefficient having a low value indicates a remote comparison between $S_i$ and the template. Preferably, the pixel data in the symbol and template bit maps are centered within the bit map and rotationally aligned. The bit maps may be X/Y scaled to the same number of pixel rows and pixel columns which provides corresponding pixel locations in each bit map.

Any suitable comparison function may be employed such as the Cauchy-Shwartz function which is the symbol-template dot product (the summation of the product of corresponding pixels) divided by the symbol norm $\|S_i\|$ and the template norm $\|T_i\|$:

Cauchy-Shwartz Function = $(S_i) \cdot (T_i)/(\|S_i\|)(\|T_i\|)$.

The vector of each pixel contained in the input symbol bit map is multiplied by the vector of the corresponding pixel contained in the template bit map, and divided by the two norms. The norm is a normalization factor formed by the square root of the sum of the squares of each pixel value in the bit map. The Cauchy-Shwartz comparison for each symbol/template provides a comparison coefficient having a value of between 0 and 1.00 as shown along the vertical axis of FIGS. 3, 4, and 5. The above expression of the Cauchy Shwartz function may be simplified by pre-normalizing the $S_i$ term to provide:

Cauchy-Shwartz Function=$(S_i)\cdot(T_i)/(\|T_i\|)$.

The $S_i$ term in the new simplified expression now represents the more complex earlier term $(S_i)/(\|S_i\|)$. In terms of the simplified Cauchy Shwartz function, the enhancement process becomes:
for the primary comparison $C^* = (S_i)\cdot(T^*)/(\|T^*\|)$, and for the secondary comparison $C^{} = (S_i)\cdot(T^{})/(\|T^{**}\|)$.

Mathematically, the template enhancement process involves finding a set of vector templates $(T_1\ T_2\ T_3\ \ldots\ T_i\ \ldots\ T_G)$ which maximizes (over all of the templates) the minimum recognition margin between the primary comparison C* and the maximum secondary comparison C**:

maximize $M$=Min $C^*$−Max $C^{**}$ maximize $M$=Min
$[(S_i)\cdot(T^*)/(\|T^*\|)]-\text{Max}\{(S_i)\cdot(T^{})/(\|T^{}\|)\}]$.

The derivatives for the Cauchy-Shwartz comparison function become:

$dM/dT^* = dC^*/dT^* - dC^{**}/dT^*$
$= S_i/\|T^*\| - (S_i \cdot T^*)T^*/(\|T^*\|)^3$ and $dM/dT^{**} = dC^*/dT^{} - dC^{}/dT^{**}$
$= S_i/\|T^{}\| - (S_i \cdot T^{})T^{}/(\|T^{}\|)^3$.

META-BLACK META-WHITE AND FADING (FIG. 6)

The input symbol bit map and initial image bit maps may be in binary data format (1s and 0s), or may contain toner greyscale data scanned from the toner (or ink) of printed fonts. The scanning and processing may introduce noise elements due to electronic signals and mechanical vibration which distort the levels of greyscale (or binary data). As the iterations proceed, the enhanced templates develop abberations formed by incremental weighting which combines (by addition or subtraction) with any toner greyscale and noise distortion already in the bit map. The fractional nature of the weighting increments causes all binary initial images to evolve into non-binary templates. The greyscale initial images are of course already non-binary. The weighting increments are added to the pre-existing greyscale to produce "meta-black" and "meta-white" greyscale levels which are beyond the darkest black and lightest white obtainable from printed fonts. The accumulation of the weighting abberations in each anti-character template causes the secondary comparison C** to decrease and the recognition margin M to increase.

FIGS. 6A–6H show the development of meta-black and meta-white weighting during the first 16 iterations of the "censu" anti-character example for the input symbol "o" discussed previously. These figures show the greyscale level of each pixel along the middle horizontal row of pixels within the "oce" bit map templates.

This middle row cross-section contains the critical differences between the "oce" templates, which are
 1) the black horizontal bar of the "e", both "o" and "c" have all white center regions;
 2) the white right side gap of the "c"; and 3) the black right side stroke of the "o" at the position corresponding to the "c" gap.

The stroke width shown in FIG. 6 lower-case templates is four pixels.

The bit map pixels in the FIG. 6 embodiment have 256 levels of greyscale, 128 levels on either side of a zero half-toned level. Level +100 represents the blackest intensity available from the toner of the printed character; and level −100 represents the whitest intensity available from the white paper background. In the FIG. 6 embodiment all toned pixels have the darkest +100 level, and all background pixels have the whitest −100 level. The row cross-sections are shown in ideal form, noise free with square corners and perfect vertical black/white interfaces. Levels +101 through +128 above the toner level are reserved for the meta-black values, and levels −101 through −128 below the background level are reserved for meta-white values.

Figure 6A:
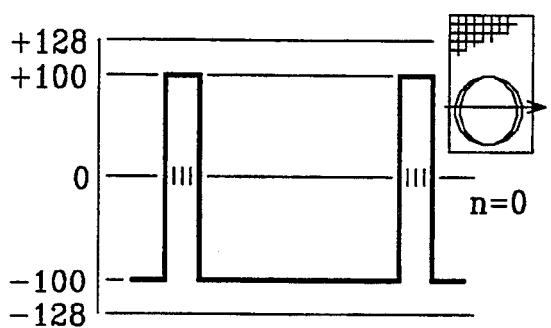
FIGS. 6A–6G are pixel cross-sections of the "o", "c" and "e" template bit maps showing the development of meta-levels and fading levels during the enhancement process.
Figure 6B:
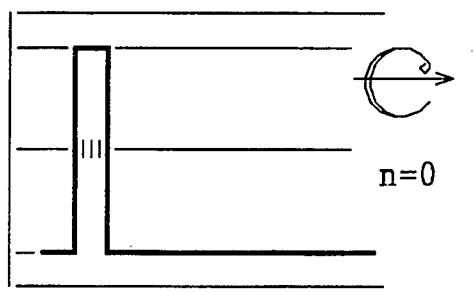

FIG. 6A shows the middle row cross-section of the initial "o" template before any iterations (at n=0). The black lefthand stroke and the righthand stroke of the "o" are stored as four dark pixels (+100). The white left and right margins and center region of the "o" are stored as white pixels (−100). FIG. 6B shows the corresponding cross-section of the initial "c" template (n=0) with four dark pixels for the black lefthand stroke and white pixels for the remainder of the pixel row. The white is the left and right margins and center region of the "c" plus the righthand gap.

META-BLACK META-WHITE

Figure 6C:
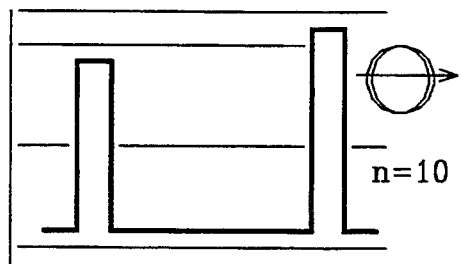
Figure 6D:
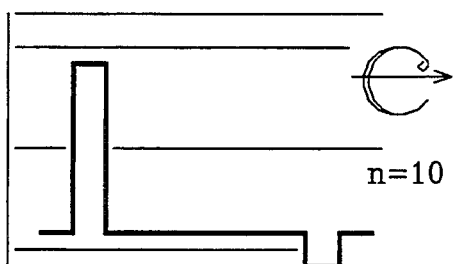

FIGS. 6C and 6D show the "o" and "c" cross-sections after the tenth iteration (n=10) of enhancement process between the templates. The "o" cross-section has developed a slight meta-black abberations (greater than +100) over the righthand stroke, and the "c" cross-section has developed a slight meta-white abberations (less than −100) under the righthand gap. The meta-levels are added to the templates when the corresponding pixel of the two template bit maps have opposite signs. That is, when a pixel of one template is + (black), and the corresponding pixel of the other template is − (white). This additive effect for opposite pixels is due to the change in polarity introduced by the baltic recognition margin relationship:

maximize $M = \min[C^* - \max(C^{**})]$.

The meta-levels emphasize the difference between the selected C* and C** templates.

FADING

An opposed subtractive fading effect occurs when the corresponding pixels have the same sign, both + (black) or both − (white). Thus, the white left margin in both n=10 templates have evolved from the maximum white of −100 (FIGS. 6A and 6B, n=0) to a less intense white (FIGS. 6C and 6D, n=10). The right margin and white center regions of both templates have also shifted upward to the less intense position. The fading levels suppress the similarities between the C* and C** templates.

The following table shows the development of meta-levels for opposite pixels and fading level for like pixels for 10 iterations at a weighting factor of u=0.01.

| C* Template at n = 0 | C** Template at n = 10, u = .01 | Weighted n = 10 |
|---|---|---|
| Black +100 | White −(−0.1) | +100.9 |
| White −100 | Black −(+1.0) | −100.0 |
| Black +100 | Black −(+0.1) | +99.9 |
| White −100 | White −(−0.1) | −99.9 |

Figure 6E:
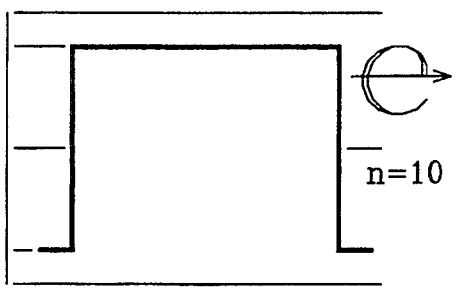
Figure 6F:
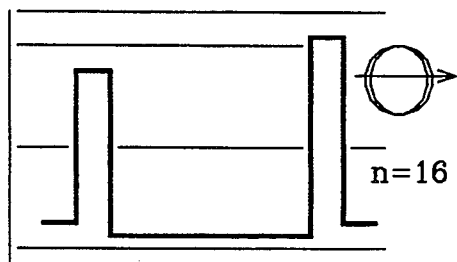
Figure 6G:
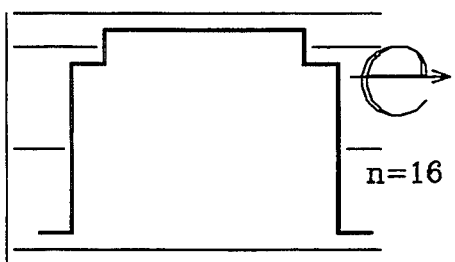

FIG. 6E shows the middle row cross-section of the initial "e" template before any iterations (n=0). The horizontal bar of the "e" appears as a major black region (+100). During the 11th iterations, the "e" template becomes a C** anti-character to the "o" template. FIGS. 6F and 6G show the "c" and "e" cross-sections after six more iterations (n=16). The "e" cross-section has developed a meta-black abberation along black the horizontal bar pixels. The "o" cross-section has shifted towards the meta-white along the white center region. Both the "e" cross-section and "o" cross-section have faded slightly over the left and right strokes because of the common black in both templates. The "e" and "o" cross-sections have also faded slightly over the left and right margins because of the common white. The meta-levels and fading levels which emphasize the differences and suppress the similarities, may be viewed as in balance due to the RMS nature comparison coefficients. The square root of the sum of the square of the pixel levels within each bit map remains constant. Therefore, for each meta level development within an advanced template, there is an equal and opposite fading development.

CONCLUSION

It will be apparent to those skilled in the art that the remaining objects of this invention have been achieved as described hereinbefore. Clearly various changes may be made in the structure and embodiments shown herein without departing from the concept of the invention. Further, features of the embodiments shown in the various Figures may be employed with the embodiments of the other Figures. Therefore, the scope of the invention is to be determined by the terminology of the following claims and the legal equivalents thereof.

I claim as my invention:

1. The method of matching an unknown input pixel symbol with a library of enhanced pixel templates by recognition enhancement of a library of L unenhanced pixel images ($I_1 I_2 I_3 \ldots I_j \ldots I_L$) with respect to a pre-existing group of G unknown input pixel symbols ($S_1 S_2 S_3 \ldots S_i \ldots S_G$) for providing a library of G recognition enhanced pixel templates ($T_1 T_2 T_3 \ldots T_i \ldots T_G$) of the G pixel symbols, comprising the steps of:

providing a library of L unenhanced pixel images ($I_1 I_2 I_3 \ldots I_j \ldots I_L$) to be enhanced to provide a library of G recognition enhanced pixel templates ($T_1 T_2 T_3 \ldots T_i \ldots T_G$);

providing a pre-existing group of G unknown input pixel symbols ($S_1 S_2 S_3 \ldots S_i \ldots S_G$);

comparing each of the G unknown input pixel symbols with each of the L pixel images to obtain G×L comparisons forming G sets of L comparisons ($C_1 C_2 C_3 \ldots C_j \ldots C_L$), one set of L comparisons for each unknown input pixel symbol $S_i$ of the G pixel symbols, each set of comparisons having a comparison $C_i$ for each pixel image $I_j$;

identifying the primary comparison C* from the L comparisons within each of the G sets of comparisons having the closest comparison with the unknown input pixel symbol $S_i$ for that set of comparisons forming a collection of G primary comparisons $C^*$ ($C_1^*$ $C_2^*$ $C_3^*$ ... $C_i^*$ ... $C_L^*$);

identifying the secondary comparison $C^{}$ from the L-1 remaining comparisons within each of the G sets of comparisons having the next closest comparison with the unknown input pixel symbol $S_i$ for that set of comparisons forming a collection of G secondary comparisons $C^{}$ ($C_1^{}$ $C_2^{}$ $C_3^{}$ ... $C_i^{}$ ... $C_L^{**}$), to provide G pairs of identified comparisons $C^*$ and $C^{**}$, one pair from each of the G sets of comparisons;

determining G recognition margins ($M_1$ $M_2$ $M_3$ ... $M_i$ $M_G$), one recognition margin between each pair of identified comparisons $C^*$ and $C^{**}$;

selecting the single pair of identified comparisons $C^*$ and $C^{**}$ having the smallest recognition margin $M^*$ of all of the G pairs of identified comparisons from the G sets of comparisons;

identifying the single pair of pixel images $I^*$ and $I^{**}$ corresponding to the pair of identified comparisons $C^*$ and $C^{**}$;

weighting certain pixels of the closest pixel image $I^*$ and the next closest pixel image $I^{**}$ corresponding to the selected pair of identified comparisons $C^*$ and $C^{**}$ in order to incrementally increase the recognition margin $M^*$ therebetween causing the pixel images to become the closest pixel template $T^*$ or the next closest pixel template $T^{**}$ or both;

iterating the comparing, identifying, determining, selecting, and weighting steps until the library of pixel images has become a library of enhanced symbol templates ($T_1$ $T_2$ $T_3$ ... $T_i$ ... $T_G$) which have been recognition enhanced with respect to the pre-existing group of G unknown input pixel symbols ($S_1$ $S_2$ $S_3$ ... $S_i$ ... $S_G$), at least some templates of which have weighted pixel abberations not present in the corresponding pixel symbol of the pre-existing group of G unknown input pixel symbols; and matching an unknown input pixel symbol of the group of G pixel symbols ($S_1$ $S_2$ $S_3$ ... $S_i$ ... $S_G$) with the library of enhanced templates ($T_1$ $T_2$ $T_3$ ... $T_i$ ... $T_G$) by comparing the unknown pixel symbol with each of the enhanced pixel templates in the library of enhanced templates and selecting the enhanced template with the closest comparison.

2. The method of claim 1, wherein the recognition enhancement of the pixel templates is terminated when the smallest recognition margin is greater than a predetermined minimum value.

3. The method of claim 1, wherein the recognition enhancement of the pixel templates is terminated when the incremental increase in the smallest recognition margin each iteration is smaller than a predetermined minimum increase.

4. The method of claim 1, wherein the recognition enhancement of the pixel templates is terminated when a specified number of weighting iterations have been executed.

5. The method of claim 1, wherein the recognition enhancement of the pixel templates is terminated when a preassigned period of iteration processing time has expired.

6. The method of claim 1, wherein the recognition enhancement of the pixel templates is terminated when the individual templates in clusters of similarly shaped templates have progressed to the same recognition margin and have become mutual anti-characters.

7. The method of claim 1, wherein L is greater than G and G is equal to T.

8. The method of claim 1, wherein the group of G pixel symbols are alpha-numeric symbols and the library of T pixel templates are the same alpha-numerics enhanced by weighted pixel abberations.

9. The method of claim 8, wherein L is equal to G, and G is equal to T.

10. The method of claim 9, wherein the library of G pixel images are alpha-numeric symbols corresponding to the alpha-numeric symbols of the group of G pixel symbols.

11. The method of claim 9, wherein the library of G pixel images are alpha-numeric symbols identical to the alpha-numeric symbols of the group of G pixel symbols.

12. The method of claim 1, wherein the G×L comparisons are numerical coefficients of comparison, the value of which indicates the degree of pixel similarity between the pixel symbol $S_i$ and the pixel image $I_j$ under comparison.

13. The method of claim 12, wherein a coefficient having a high value indicates a close comparison between $S_i$ and $I_j$, and a coefficient having a low value indicates a remote comparison between $S_i$ and $I_j$.

14. The method of claim 12, wherein the recognition margin is the difference between the comparisons $C^*$ and $C^{**}$ of each selected pair of comparisons.

15. The method of claim 14, wherein the recognition enhancement with respect to a particular pixel symbol $S_i$ involves maximizing the minimum recognition margin between the primary comparison $C^*$ and the maximum secondary comparison $C^{**}$ which form the selected pair of identified comparisons $C^*$ and $C^{**}$ for the pixel symbol $S_i$, in the general relationship:

$$\text{maximize } M = \min[C^* - \max(C^{**})]$$

where
 M is the recognition margin between $C^*$ and $C^{**}$,
 $C^*$ is the primary comparison for the template $T^*$ which is the closest template in the library to the pixel symbol $S_i$, and
 $C^{}$ is the secondary comparison for the template $T^{}$ which is the second closest template in the library to the pixel symbol $S_i$.

16. The method of claim 15, wherein only the closest pixel image $I^*$ is weighted causing the closest pixel image $I^*$ to become the closest pixel template $T^*$.

17. The method of claim 16, wherein the weighting added to the closest template $T^*$ each iteration is determined by the first derivative of the recognition margin $M^*$ relative to the template $T^*$:

$$W^* = u^*(dM/dT^*) = u^*(dC^*/dT^* - dC^{**}/dT^*)$$

where
 $W^*$ is the weighting added each iteration, and
 $u^*$ is a weighting factor mu* for $dM/dT^*$.

18. The method of claim 17, wherein each iteration of the enhancement process produces a new $T^*$ template which is slightly different from the old $T^*$ template:

$$T^*_{n+1} = T^*_n + W^* = T^*_n + u^*(dM/dT^*)$$
$$= T^*_n + u^*(dC^*/dT^* - dC^{**}/dT^*)$$

where
 n is the number of the iteration,
 $T^*_{n+1}$ is the new $T^*$ template, and
 $T^*_n$ is the old $T^*$ template.

19. The method of claim 15, wherein only the next closest pixel image $I^{}$ is weighted causing the next closest pixel image $I^{}$ to become the next closest pixel template $T^{**}$.

20. The method of claim 19, wherein the weighting added to the next closest template $T^{}$ each iteration is determined by the first derivative of the recognition margin $M^{}$ relative to the template $T^{**}$:

$$W^{} = u^{}(dM/dT^{}) = u^{}(dC^*/dT^{} - dC^{}/dT^{**})$$

where
 $W^{**}$ is the weighting added each iteration, and
 $u^{}$ is a weighting factor mu for $dM/dT^{**}$.

21. The method of claim 20, wherein each iteration of the enhancement process produces a new $T^{}$ template which is slightly different from the old $T^{}$ template:

$$T^{}_{n+1} = T^{}_n + W^{} = T^{}_n + u^{}(dM/dT^{})$$
$$= T^{}_n + u^{}(dC^*/dT^{} - dC^{}/dT^{**})$$

where
 n is the number of the iteration,
 $T^*_{n+1}$ is the new $T^{**}$ template, and
 $T^{}_n$ is the old $T^{}$ template.

22. The method of claim 15, wherein both the closest pixel image $I^*$ and the next closest pixel image $I^{**}$ are weighted causing the closest pixel image $I^*$ to become the closest pixel template $T^*$ and the next closest pixel image $I^{}$ to become the next closest pixel template $T^{}$.

23. The method of claim 22, wherein the weighting added to $T^*$ and to template $T^{**}$ each iteration are determined by the first derivative of the recognition margins $M^*$ and $M^{**}$ relative to templates $T^*$ and $T^{**}$:

$$W^* = u^*(dM/dT^*) = u^*(dC^*/dT^* - dC^{**}/dT^*)$$

$$W^{} = u^{}(dM/dT^{}) = u^{}(dC^*/dT^{} - dC^{}/dT^{**})$$

where
 $W^*$ is the weighting added to $T^*$ each iteration,
 $u^*$ is a weighting factor mu* for $dM/dT^*$,
 $W^{}$ is the weighting added to $T^{}$ each iteration, and
 $u^{}$ is a weighting factor mu for $dM/dT^{**}$.

24. The method of claim 23, wherein the weighting factor $u^*$ is equal to the weighting factor $u^{**}$.

25. The method of claim 23, wherein each iteration produces a new $T^*$ and $T^{**}$ templates which are slightly different from the old $T^*$ and $T^{**}$ templates:

$$T^*_{n+1} = T^*_n + W^* = T^*_n + u^*(dC^*/dT^* - dC^{**}/dT^*)$$

$$T^{}_{n+1} = T^{}_n + W^{} = T^{}_n + u^{**}(dC^*/dT^{} - dC^{}/dT^{**})$$

where
 n is the number of the iteration,
 $T^*_{n+1}$ is the new $T^*$ template,
 $T^*_n$ is the old $T^*$ template,
 $T^{}_{n+1}$ is the new $T^{}$ template, and
 $T^{}_n$ is the old $T^{}$ template.

26. The method of claim 12, wherein the value of each numerical coefficient of comparison $C_j$ is based on a pixel by pixel comparison between each pixel of pixel symbol $S_i$ and each pixel of pixel image $I_j$ under comparison.

27. The method of claim 26, wherein the pixel by pixel comparison is the dot product between each pixel of pixel symbol $S_i$ and each pixel of pixel image $I_j$ under comparison.

28. The method of claim 26, wherein the pixel by pixel comparison is based on the Cauchy-Shwartz Function:

$$\text{Cauchy-Shwartz Function} = (S_i) \cdot (T_i)/(\|S_i\|)(\|T_i\|).$$

where
 ($S_i$) is the input symbol under comparison,
 ($T_i$) is the enhanced template under comparison,
 ($\|S_i\|$) is the symbol norm, and
 ($\|T_i\|$) is the template norm.

* * * * *